March 8, 1938.  A. L. DAVIS  2,110,391
MAXIMUM AND MINIMUM VOLTMETER
Filed Nov. 19, 1936
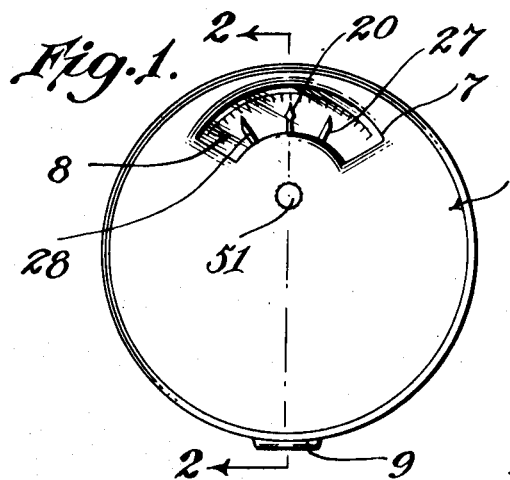
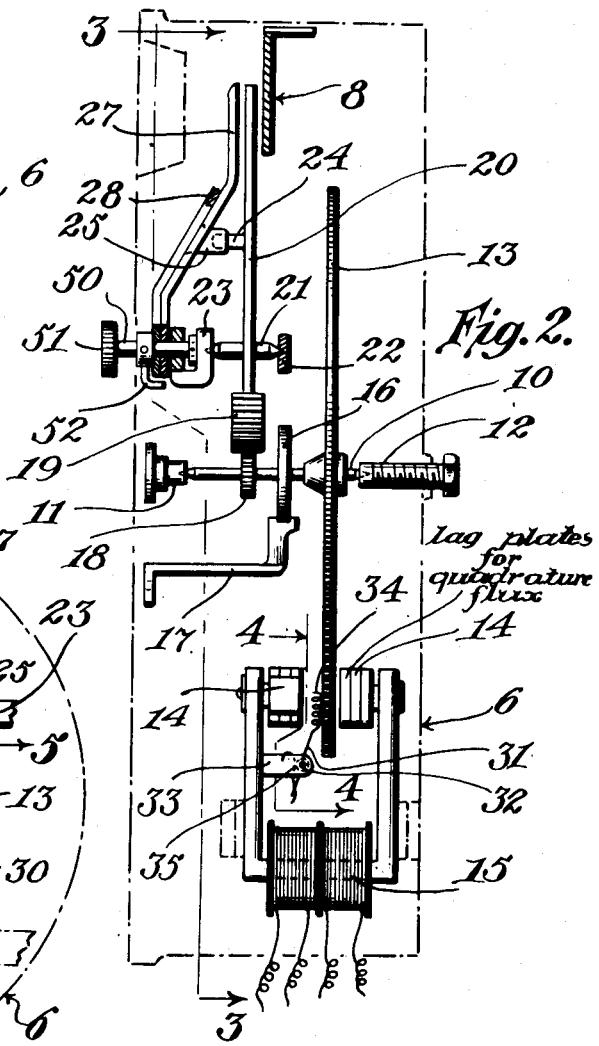
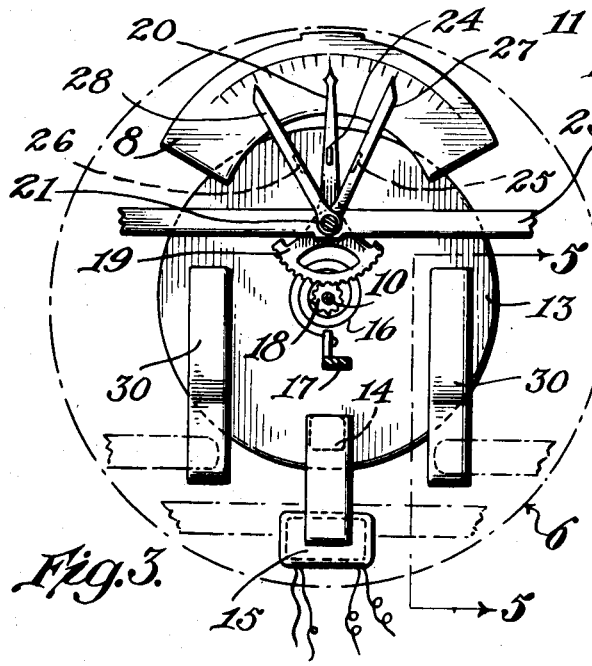
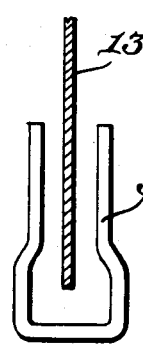
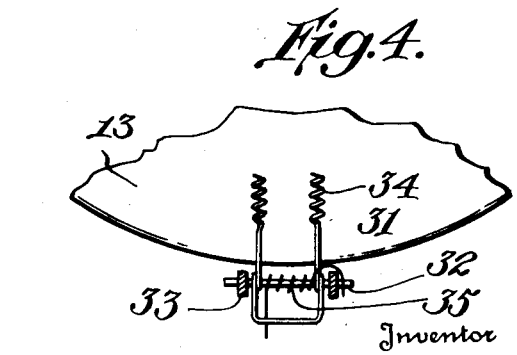
Inventor
Arthur L. Davis
By
Attorney Patented Mar. 8, 1938

2,110,391

UNITED STATES PATENT OFFICE 2,110,391

MAXIMUM AND MINIMUM VOLTMETER

Arthur L. Davis, Turners Falls, Mass.

Application November 19, 1936, Serial No. 111,750

4 Claims. (Cl. 171—95)

This invention relates to electrical measuring instruments and particularly to maximum and minimum induction voltmeters.

The primary object of the invention is to provide such a meter for voltage surveys on distribution systems and other places where it is desirable to obtain an indication of voltage variation and spread.

The instrument includes maximum and minimum pointers, with an operating pointer operated by a disc which is turned by electro-magnetic means against the resistance of a helical spring. When the instrument is energized the disc turns until the torque of the spring is equal to the torque of the disc, then the disc stops. The torque of the disc is proportional to the supplied voltage. If the voltage increases, the disc will assume a new position, carrying the pointer with it through a gear and sector connection; and if the voltage drops the torque of the spring will turn the disc in the reverse direction until equilibrium is again established. The position of the disc and consequently the pointer at any given time is a function of the voltage at that time and is indicated on a suitable scale. By means of suitable maximum and minimum pointers, moved by the indicating pointer, the maximum and minimum voltage that has occurred since the pointers were last reset is shown on the scale. The disc is prevented from turning back when current is off by means of a magnetic brake in the magnetic air gap, which binds the disc when current is off but is released by the magnetism in the air gap when the actuating coil is energized.

One form of the invention is illustrated in the accompanying drawing in which:

Fig. 1 is a plan view of the instrument.

Fig. 2 is an enlarged section on the line 2—2 of Fig. 1.

Fig. 3 is a section on the line 3—3 of Fig. 2.

Fig. 4 is a detail in section on the line 4—4 of Fig. 2.

Fig. 5 is a detail in section on the line 5—5 of Fig. 3.

Referring particularly to the drawing, 6 indicates the casing of the instrument, which may be of suitable size and shape to support the parts to be described. It has a sight opening 7 through which the scale plate 8 may be seen, and may be provided with a plug connection 9 which may be arranged for series or parallel operating coil connections for different voltage such as 115 or 230 v. Mounted within the casing is an arbor 10 supported between jeweled or other suitable bearings 11 and 12 and fixed to this arbor is an aluminum disc 13 arranged to revolve or turn between the pole pieces 14 of an electromagnet, the coils of which are indicated at 15. As well known in the art, these pole pieces 14 are made up of lag plates which set up out of phase magnetic flux, causing rotation of the disc.

A coiled spring 16 is fixed at one end to the arbor 10 and at the other end to a suitable support 17 attached to the casing; and this spring resists the turning of the disc incident to the energization of the magnet.

The arbor 10 carries a pinion 18 in mesh with a sector 19 on a pointer 20 which turns on an arbor 21, suitably supported by brackets 22 and 23 secured to the casing. The outer end of the pointer or index 20 swings in front of the scale 8.

The pointer has a finger 24 projecting in line of movement between lugs 25 and 26 projecting from maximum and minimum pointers 27 and 28 respectively, so that as the indicating pointer 20 swings one way or the other the finger 24 by contact with the lugs 25 or 26 will move the pointers 27 and 28 accordingly.

The disc turns between the ordinary drag magnets 30, and to prevent movement of the disc when the current is off I provide a magnetic brake which may consist of a U-shaped wire 31 pivoted on a pin 32 supported by brackets 33 on one of the pole arms. This brake wire has coils 34 at the ends thereof which, when the current is off, are pressed against the disc by a spring 35 coiled around the pin 32 and bearing against the brake. When the operating coil 15 is energized the magnetic force pulls the parts 34 to the pole piece and away from the disc, thereby freeing the latter. When the current is off the spring 35 presses the part 34 against the disc thereby holding it stationary by frictional contact.

The maximum and minimum pointers are loosely pivoted on a pin or pintle 50 which has a knob 51 at the front of the casing and the pintle has fixed thereto a finger 52 so that by turning the knob one way or the other the finger 52 will contact with the pointers and thereby reset the same to appropriate position contiguous to the indicating pointer 20, to be moved thereby as above described.

The instrument provides a means for indicating, by the maximum and minimum pointers, the maximum and minimum voltage in lines.

I claim:

1. A maximum and minimum voltmeter comprising a rotatable disc, means, including an electro-magnet having pole pieces which define an air gap through which the disc is rotatable, for producing rotative movement of the disc, a shaft for supporting the disc, a spring operatively connected to the disc to resist turning thereof, an index pointer and gearing which connects the pointer to the shaft, and maximum and minimum pointers supported at opposite sides of the index pointer and provided with abutment means in the path of movement of the index pointer to be struck and shifted thereby.

2. A maximum and minimum voltmeter as defined in claim 1, and a magnetic brake engageable with the disc and located between the disc and a pole-piece of the electro-magnet and adapted to be attracted and released when the magnet is energized.

3. In an electric meter, the combination with a rotatable disc and means, including an electro-magnet having pole pieces which define an air gap through which the disc is rotatable, for producing rotative movement of the disc, of a spring-pressed magnetic brake engaging the disc near the edge thereof and located directly in the air gap between the disc and a pole-piece of the magnet and movable in said gap from one to the other and adapted to be attracted and released by the magnet when the latter is energized and deenergized.

4. In a maximum and minimum voltmeter, the combination of a rotatable disc and an arbor on which it is mounted, and means, including an electro-magnet having pole pieces which define an air gap through which the disc is rotatable, for producing rotative movement of the disc, a spring attached to the arbor and resisting the movement of the disc, and gearing which connects the pointer to the arbor, maximum and minimum pointers supported at opposite sides of the index pointer and provided with abutments in the path of movement of the index pointer to be contacted and shifted thereby to positions corresponding to maximum and minimum voltages.

ARTHUR L. DAVIS.